UNITED STATES PATENT OFFICE.

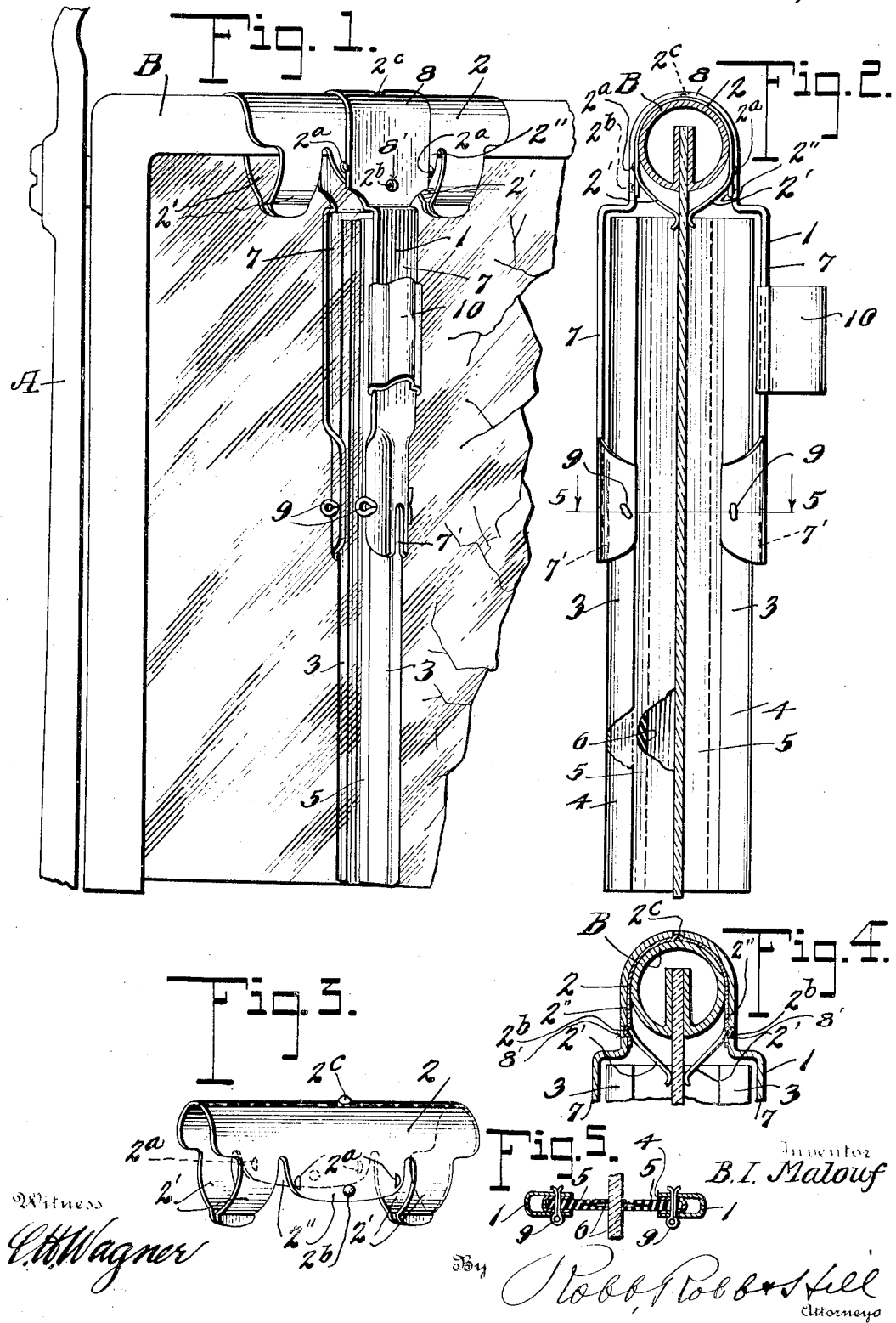

BESHARA I. MALOUF, OF SALT LAKE CITY, UTAH.

WINDSHIELD-CLEANER.

1,392,190.   Specification of Letters Patent.   Patented Sept. 27, 1921.

Application filed August 11, 1920. Serial No. 402,769.

*To all whom it may concern:*

Be it known that I, BESHARA I. MALOUF, a citizen of the United States, residing at Salt Lake City, in the county of Salt Lake and State of Utah, have invented certain new and useful Improvements in Windshield-Cleaners, of which the following is a specification.

The present invention relates to improvements in wind shield cleaners, now generally recognized as of the squeegee type.

In the design of my invention I have had in mind several points of consideration, which in a device of this character tend to enlarge its usefulness and practicality. In other words, in the carrying out of my invention my aim has been to provide an article which is capable of quick and ready adjustment not only to a particular wind shield, but to wind shields which more or less vary in form and construction, while at the same time producing a device designed with a view to cheapness of manufacture.

To this end the invention embodies but two main parts, a wiper which is movable over the surface of the wind shield glass, and an attachment element for holding it in position upon the wind shield, the invention residing more especially, but not entirely, in the latter element.

With these and other objects in view, the invention consists in certain novel combinations and arrangements of parts as will more fully appear as the description proceeds, the novel features thereof being pointed out in the appended claims.

For a full understanding of the invention, reference is to be had to the following description and accompanying drawings, in which:—

Figure 1 is a fragmentary perspective view of a wind shield having my invention applied in operative position thereon;

Fig. 2 is a sectional view through the wind shield, showing the device in side elevation;

Fig. 3 is a perspective view of the connector piece of the device;

Fig. 4 is a sectional view through the upper portion of the device on a somewhat enlarged scale; and Fig. 5 is a sectional view on the line 5—5 of Fig. 2.

Corresponding and like parts are referred to in the following description and indicated in all of the views of the drawings by the same reference characters.

Specifically describing the invention and referring to the drawings, A designates a wind shield of conventional form, and B the upper glass section of the same. These wiper devices are usually mounted upon the upper glass section, as my device is designed to be disposed.

The invention comprises the wiper member 1 and the connector piece 2. The former of these elements consists in the preferred embodiment shown in the drawing of a pair of wipers 3, 3, which are designed to rest against the opposite sides of the wind shield glass so that when the cleaner is moved to and fro it removes moisture, snow or rain from both sides of the glass. It is within the purview of this invention, however, to employ a construction in which only a single wiper member would be involved and hence I do not wish to be limited to the use of the double wipers shown. Each of these wiper members consists of the channeled piece 4 in which is mounted a rubber or squeegee 5, said member being preferably formed with a V-shaped slot 6 in the edge thereof as shown most clearly in Fig. 4. Thus when the rubber is moved across the face of the glass the moisture which is not removed by one edge will be collected by the other edge and allowed to run down between the two edges or in the slot 6. These wiper elements are mounted upon depending fingers 7 of the spring pressure means 8 which straddles the wind shield as clearly shown in the drawings. The wiper members furthermore are pivotally connected to the end of the fingers 7 and 9 so that they will readily conform to the surface of the glass and will contact therewith along their complete length regardless of the slight variations in the frame of the wind shield upon which the spring pressure means may be mounted. The ends of these fingers are preferably slotted as at 7' so as to enable a wide range of movement of the wiper elements as desirable in attaching and detaching the device. To facilitate movement of the device one of the spring fingers is provided with a handle or finger piece 10 consisting of a piece of sheet metal stamped into suitable form to engage about the finger as clearly shown.

The important feature of this device may be said to be the connector piece 2 which will now be specifically described. This connector piece is of saddle like form, and is relatively long so as to afford a broad or long contacting surface when disposed upon the wind shield frame. The connector piece or clip is stamped from a piece of spring metal and is bent into semi-cylindrical form, being cut, however, to provide a series of fingers 2', a pair of which are provided at each end. These fingers coact with the opposite sides of the glass and tend to prevent displacement in an upward direction of the wiper when the same is being manipulated in this direction by the operator. The central portion of the clip member at each side is formed with a depending lip 2'' and from each of these lips spaced protuberances 2ᵃ, 2ᵃ are punched so as to engage with the opposite edges of the arch portion of the spring pressure means when the latter is mounted upon the clip in operative position. These projections tend to prevent swinging of the wiper member from its vertical position. Centrally of each lip 2'' a further protuberance 2ᵇ is stamped while a still further protuberance 2ᶜ is formed at the top of the clip, these three being adapted to interlock with openings 8' in the arched portion of the spring pressure means, to thereby detachably connect the wiper member to the connector piece or clip. This form of connection permits ready displacement of the wiper member from the connector piece as when attaching and detaching the device from the wind shield.

It will be observed from the foregoing description that in the operation of the wiper which is designed to be moved back and forth across the wind shield, the clip or connector piece performs the several functions of guiding these movements, preventing displacement of the wiper device, and forming the connection means for positively holding the attachment in place upon the wind shield and in its vertical operative position. At the same time it is readily removable from the wind shield by disengaging the interlocking protuberances 2ᵇ as an incident to spreading of the wiper members apart, slipping the wiper member from the saddle like connector piece and then removing this latter piece from the shield frame. The reverse of the application of the device is also readily accomplished as will be apparent. The connector piece readily conforms to wind shield frames of different thicknesses or configurations, and the sections 2' of this piece by virtue of their contact with the glass 10 to maintain the central lips 2'' in interlocking relation with respect to the spring pressure means of the wiper member.

From a manufacturing standpoint the article is capable of being cheaply manufactured as hereinbefore premised, the parts thereof being capable of stamping from sheet metal excepting of course the squeegee or rubber which is used in connection therewith.

Having thus described my invention, what I claim as new and desire to secure by Letters Patent is:—

1. A wind shield cleaner including a U-shaped clip adapted to straddle an edge portion of the wind shield and to slide thereon, a wiper element, and a spring arm carrying the wiper element, said spring arm being formed with a looped portion which has a quickly detachable spring acting interlocking connection with the clip.

2. A wind shield cleaner including a U-shaped clip adapted to straddle an edge portion of the wind shield and to slide thereon, a pair of wiper elements adapted to engage opposite faces of the wind shield glass, and an arched spring strip carrying the wiper elements, the curved portion of the spring strip fitting over the clip and having a quickly detachable spring acting interlocking engagement with the clip.

3. A wind shield cleaner including a U-shaped clip adapted to straddle an edge portion of a wind shield and to slide thereon, a pair of wiper elements adapted to engage opposite faces of the wind shield glass, and an arched spring strip carrying the wiper elements, the curved portion of the spring strip fitting over the clip and said clip and arched spring being provided with complemental apertures and protuberances whereby a quickly detachable interlocking connection is obtained.

4. A wind shield cleaner including a one-piece U-shaped clip adapted to straddle an edge portion of the wind shield and to slide freely thereon, said clip being provided with spaced sets of ears adapted to resiliently engage the wind shield glass to hold the clip in position thereon and being also provided with intermediate ears, wiper elements adapted to engage the wind shield glass, and wiper element supporting means connected to the intermediate ears of the clip.

5. A wind shield cleaner of the class described, comprising a pair of wiper elements adapted to coact with the opposite surfaces of the wind shield, spring pressure means of substantially U-shaped form to the ends of the opposite sides of which the wiper members are connected, said spring pressure means having apertures therethrough, a spring clip adapted to engage the frame of the wind shield and provided with opposing fingers engaging with the wind shield surfaces, and intermediate lip extensions having protuberances adapted to interlock with the spring pressure means.

In testimony whereof I affix my signature.

BESHARA I. MALOUF.